July 23, 1968     P. A. CAIN ET AL     3,393,907
APPARATUS FOR SUPPLYING AND DRIVING CARDS
IN RECORD-CARD MACHINES
Filed April 10, 1967     7 Sheets-Sheet 1

Inventors:
Pierre Arsène Cain
and
Georges Noel Marlet
By Baldwin Wight Diller & Brown, Attorneys July 23, 1968  P. A. CAIN ET AL  3,393,907
APPARATUS FOR SUPPLYING AND DRIVING CARDS
IN RECORD-CARD MACHINES
Filed April 10, 1967  7 Sheets-Sheet 4

Inventors:
Pierre Arsène Cain
and
Georges Noel Marlet
By Baldwin Wight Diller & Brown, Attorneys 3,393,907
APPARATUS FOR SUPPLYING AND DRIVING CARDS IN RECORD-CARD MACHINES
Pierre Arséne Cain, Maisons-Laffite, and Georges Noël Marlet, Colombes, France, assignors to Societe Industrielle Bull-General Electric (Societe Anonyme), Paris, France
Filed Apr. 10, 1967, Ser. No. 629,443
Claims priority, application France, Apr. 25, 1966, 58,852
6 Claims. (Cl. 271—9)

ABSTRACT OF THE DISCLOSURE

A card-driving arrangement for driving cards, one-by-one, towards a first set of driving rollers, either from an associated card magazine or from a second set of rollers situated upstream in relation to the driving direction. The extraction of the cards, one-by-one, from the magazine may be effected by means of a roller acting intermittently so as to drive cards disposed in a stack which is urged against a fixed bearing plate, a thin flexible plate, called a floating flap, being disposed between the stack of cards and the bearing plate to form a transit passage in which a card may be advanced by the second set of rollers and then driven by the aforesaid roller.

---

Figure 1:
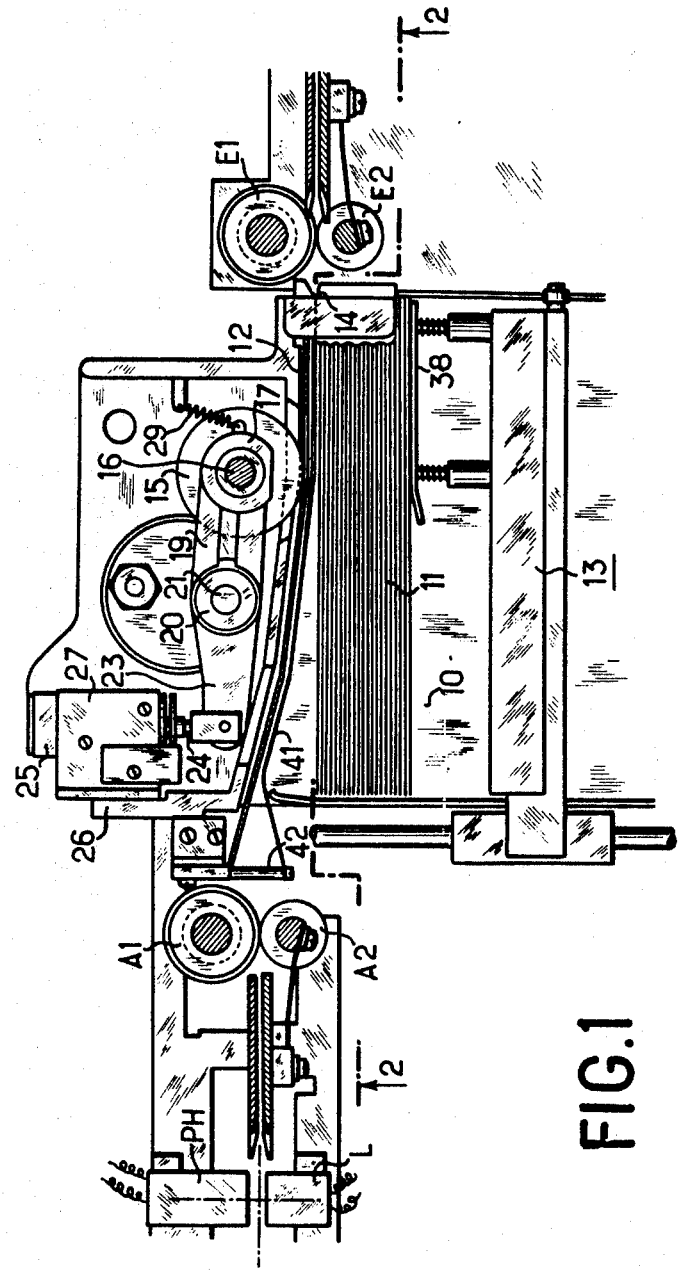

The present invention relates to apparatus for supplying and driving cards in record-card machines.

In these machines, and more particularly those known as "read-track, punching and selecting" machines, the cards to be processed, which are previously arranged in supply magazines, are extracted one-by-one from the said magazines and then advanced along track generally consisting of rotatable driving rollers in order finally to be deposited in receiving compartments. In order that these cards may be processed, each of the said tracks is provided with functional elements which perform well-known functions such as, for example, analysis of the data carried by the cards, comparison of the said data or punching of the cards. The number and the nature of these functional elements on each track vary in accordance with the type of machine in question.

Machines of a type similar to that described in United States Patent No. 3,116,922, applied for on June 7, 1960, by Compagnie des Machine Bull, in which cards advanced along a common track emanate from different racks which converge towards the said common track, are known. These machines, which afford wide possibilities of adaption, make it possible to provide high-performance assemblies which are capable of being developed. However, owing to the presence of a large number of convergent tracks, these machines are relatively heavy and bulky and necessitate a large number of functional elements and card-driving devices, which obviously make them costly.

Machines are also known in which cards emanating from a main magazine are advanced along a single track and in which cards extracted from a lateral magazine and oriented in parallel relationship to the displacement which they undergo in the track are introduced into the latter with a movement perpendicular to the said displacement in order thereafter to be driven by the feed rollers of this track. With this arrangement, the bulk of the machine may be reduced, but it is necessary to move apart the driving rollers of the track in order to enable a card extracted from the lateral magazine to be introduced, and thereafter to bring them together again in order to drive the said card, which obviously can be done only at the cost of a mechnical complication of the machine. It follows that this arrangement not only necessitates delicate adjustments of the mechanical parts which control the displacement of the said rollers, but also necessitates frequent servicing of the machine owing to the wear undergone by these parts during their operation. Moreover, these machines are relatively slow and an increase in their speed is out of the question by reason of the fact that the risks of jamming and deterioration of the cards are then greatly increased.

An object of the invention is to obviate these disadvantages by providing particularly advantageous means by which record-card machines of lower weight can be produced, which are nevertheless robust and relatively rapid, are not very bulky and are of low cost.

According to the present invention there is provided, in a record-card machine, a card-supply magazine in which cards arranged in a stack are maintained gripped against a fixed bearing plate and a pressing device movable in accordance with the thickness of the stack, the said cards being extracted from the said magazine by means of a driving member which acts by adhesion on the cards through apertures in the bearing plate while successively driving each card through a throat towards feed means, the said driving member acting intermittently so as to drive a card until it is engaged in these feed means, the said magazine being characterised in that a floating flap, consisting of a thin flexible plate, is disposed between the bearing plate and the stack of cards in order to form between the said flap and the bearing plate a transit passage in which cards can be advanced, the said flap having one of its two ends disposed close to the throat, the other end being fast with a fixed point of attachment, the said flap also being formed with apertures corresponding to those in the bearing plate to enable the driving member either to act through the said apertures so as to effect the extraction of the cards of the stack from the magazine, or to drive out of the said magazine a card engaged in the transit passage and brought level with the said apertures.

The proposed supply magazine is the more advantageous in that, while performing both the function of a supply maazine and the function of a transit member, it renders possible a simplification of the construction of the tracks, and consequently a lowering of the cost thereof. This supply magazine may also be arranged in a card-feeding track, in combination with other supply magazines of a similar or other type, without its provision presenting the disadvantages existing in machines in which the cards are supplied with a change of direction.

Figure 2:
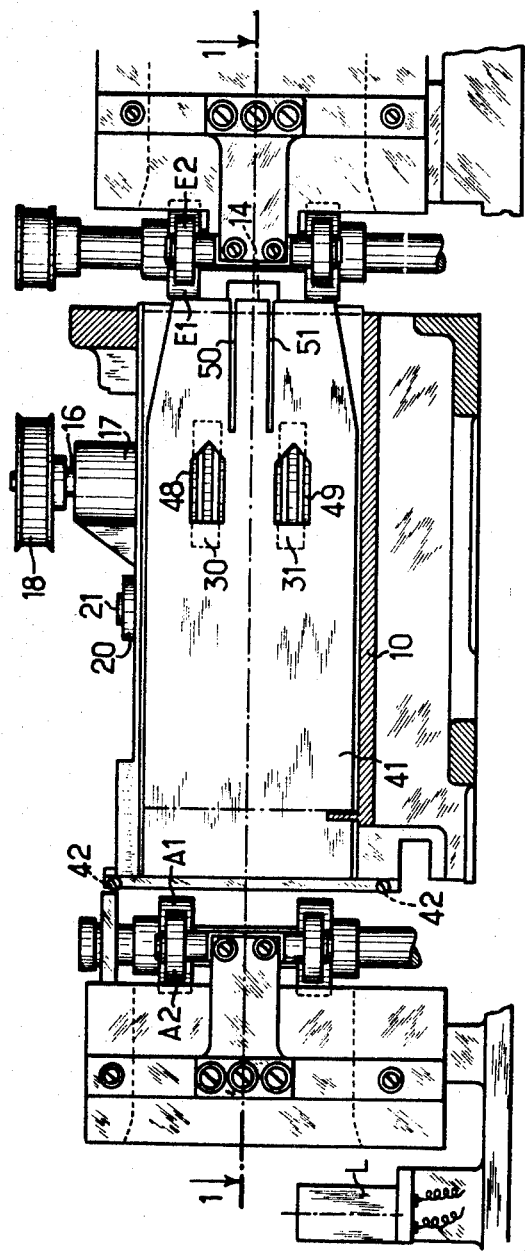
Figure 3:
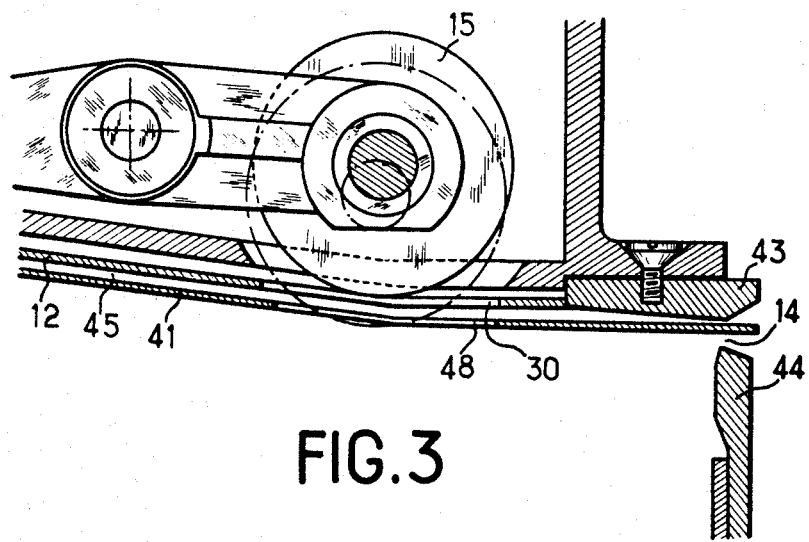
Figure 4:
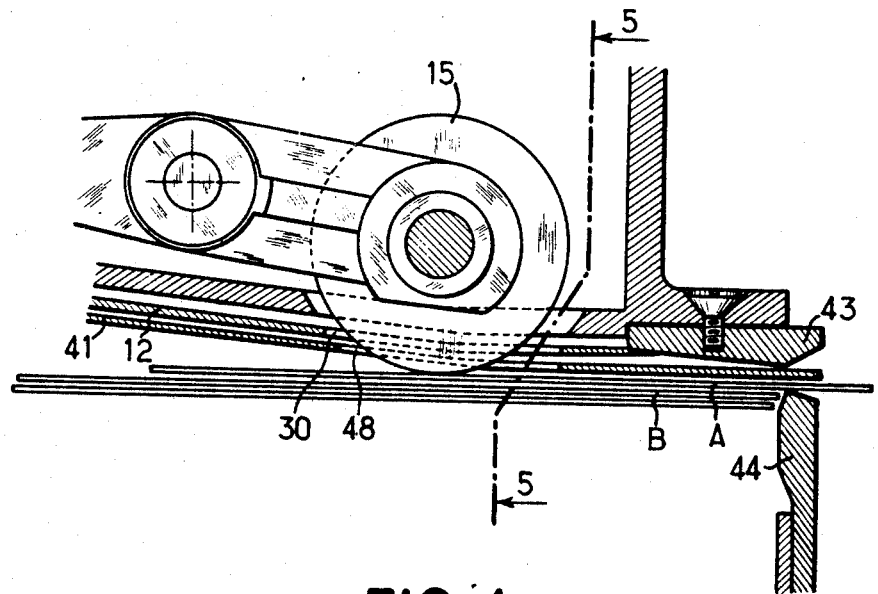
Figure 5:
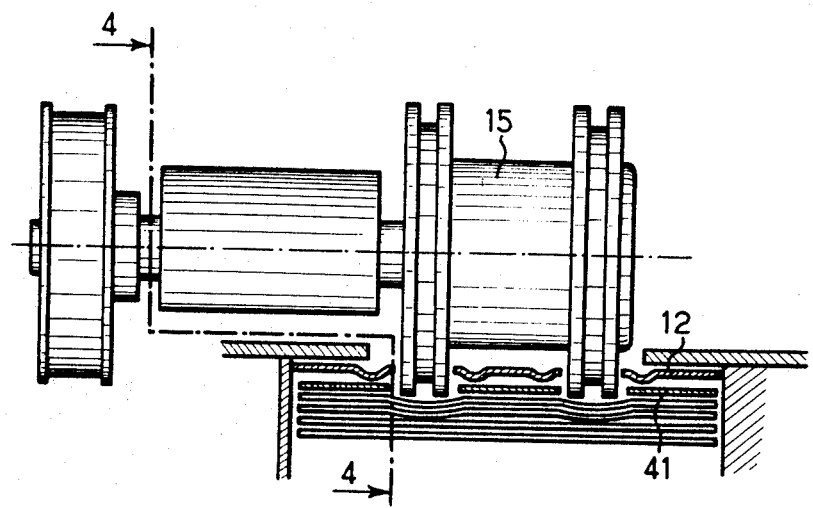
Figure 6:
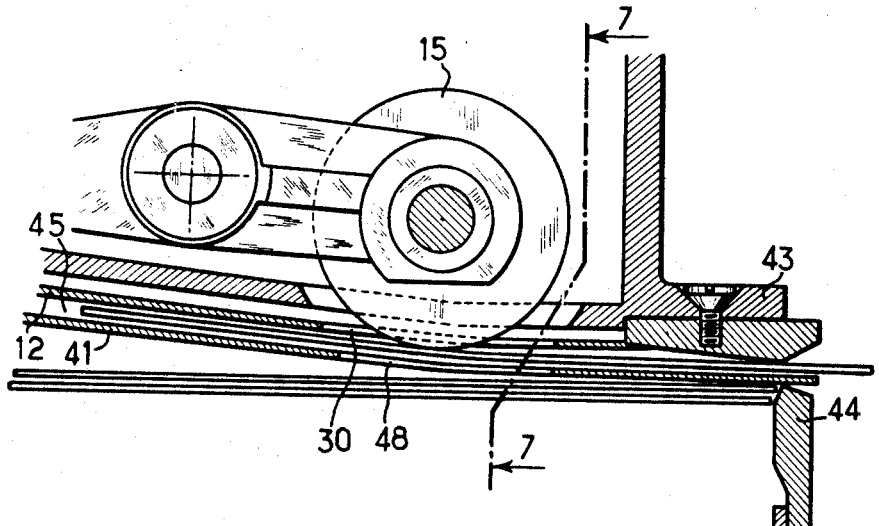
Figure 7:
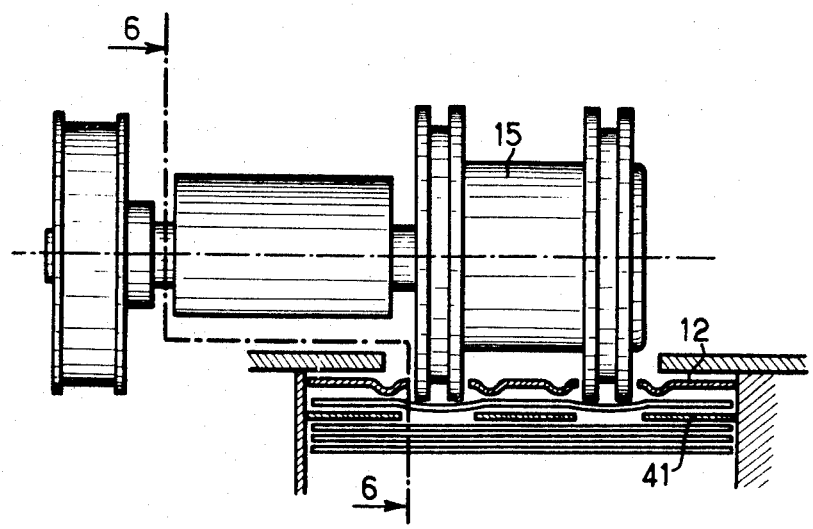
Figure 8:
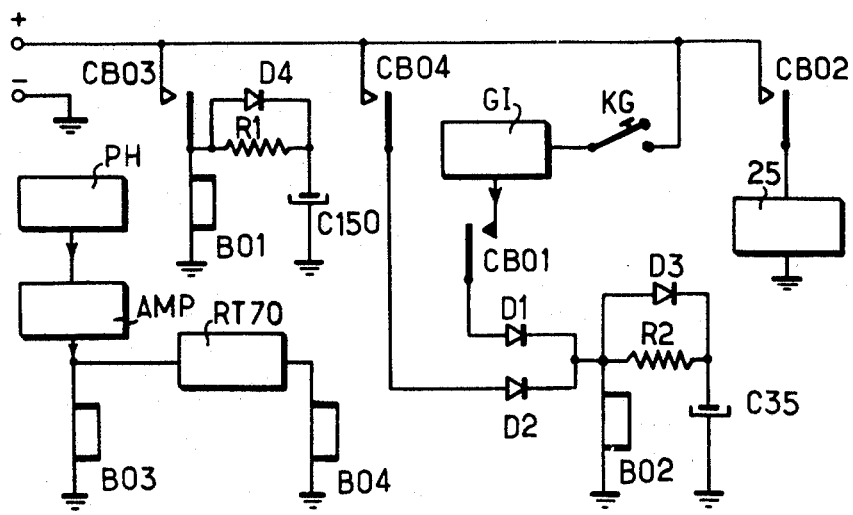
Figure 9:
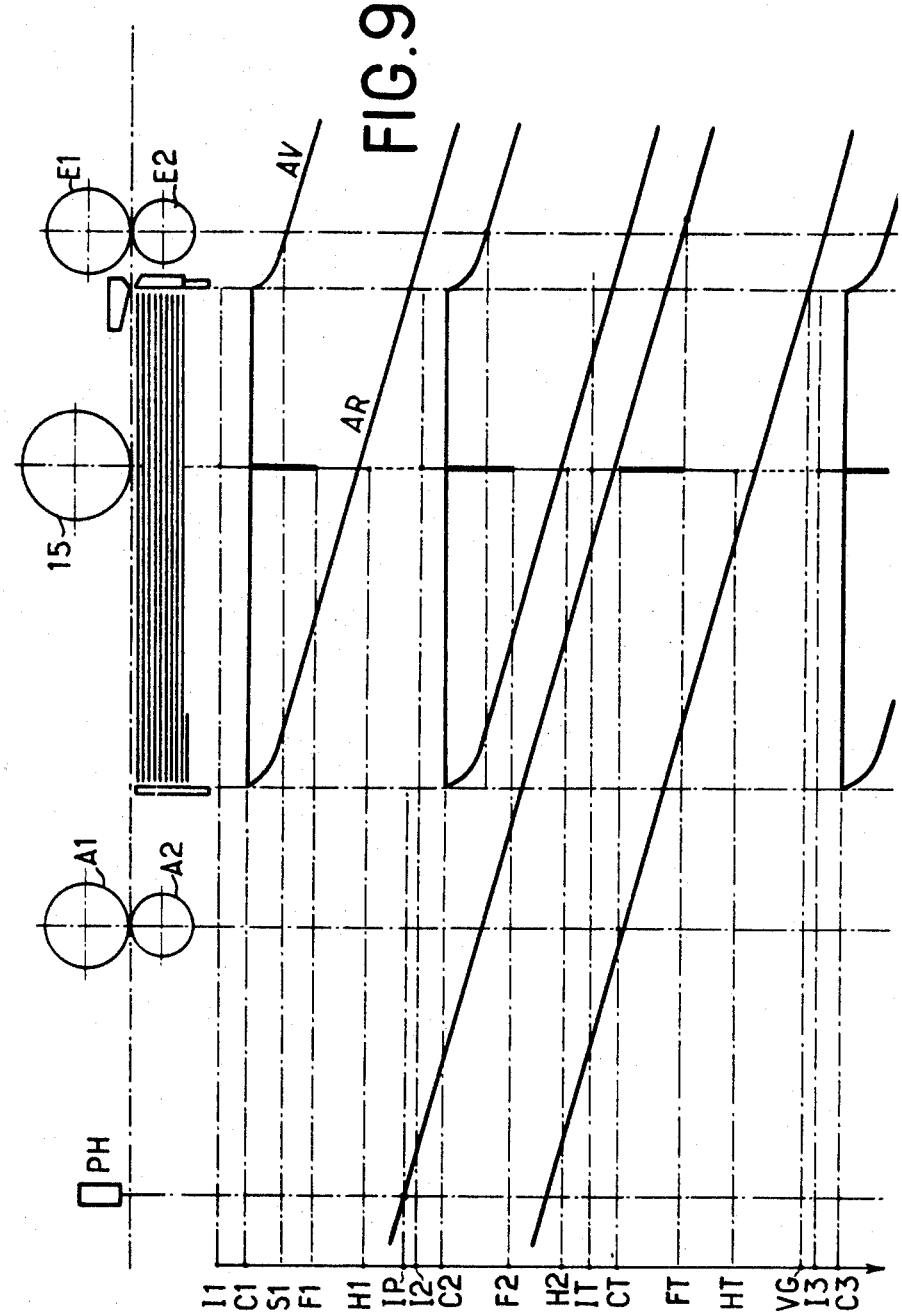
Figure 10:
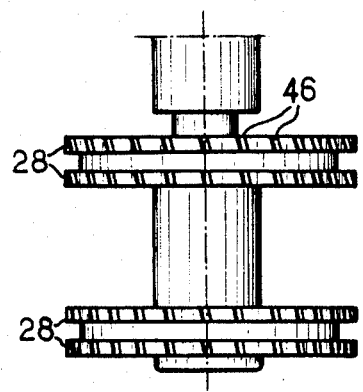
Figure 11:
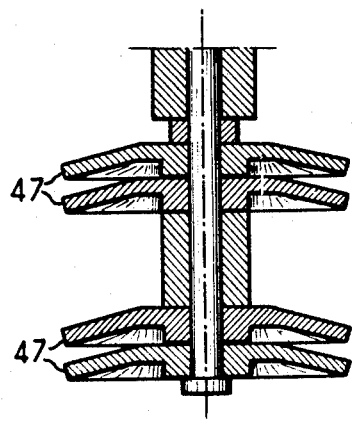

For a better understanding of the invention and to show how it may be carried into effect, the same will now be described, by way of example, with reference to the accompanying drawings, in which:

FIGURE 1 is a plan view of a supply magazine according to the invention, some parts of which are shown broken-away and in fragmentary section in order to illustrate certain constructional details, FIGURE 2 is an elevational view of the front part of the supply magazine in a section along the line 2—2 of FIGURE 1, FIGURE 3 is a detailed view, drawn to a larger scale, of a part of the magazine illustrated in FIGURE 2, the magazine being shown partly in section along the line 1—1 indicated in FIGURE 2, FIGURE 4 is a view of the part illustrated in FIGURE 3, showing the relative positions of various elements of the mechanism in one case of application, FIGURE 5 is a view of the part indicated in FIGURE 4 in a section along the line 5—5 of FIGURE 4, FIGURE 6 is a view of the part illustrated in FIGURE 3, showing the relative positions of various elements of the mechanism in another case of application, FIGURE 7 is a view of the part indicated in FIGURE 6 in section along the line 7—7 of FIGURE 6, FIGURE 8 is a diagram of the electric circuits for the control of the driving mechanism forming part of the magazine illustrated in FIGURE 1, FIGURE 9 is a diagram indicating the positions occupied by various cards in the course of time in one example of practical application, and FIGURES 10 and 11 are two views showing two types of rollers which may be employed in the driving mechanism forming part of the magazine illustrated in FIGURE 1.

FIGURE 1 is intended to illustrate the main features of a card-supply and driving apparatus designed in accordance with the invention. In a preferred embodiment of the invention, there is illustrated in FIGURE 1 a card supply magazine which comprises a plate 10 arranged horizontally to serve as a support for a stack 11 of cards resting on edge on the said plate. This stack of cards is urged against a fixed bearing plate 12 under the action of a card-pressing plate 38 forming part of a movable pressing device 13 which pushes the stack of cards in the direction of the bearing plate. The cards thus pressed may be extracted from the magazine by means of a driving member acting by adhesion, which will hereinafter be described, whereafter they pass through a throat 14, the function of which is to control the extraction of the cards. The opening of the throat is so designed as to enable the cards to be extracted one-by-one from the magazine. The extracted cards are thereafter taken up and advanced as they are extracted, by means of a set of two continuously rotating extraction rollers E1 and E2.

The driving mechanism by which the cards can be extracted from the magazine is a driving mechanism acting by adhesion of known type. Referring to FIGURES 1 and 2, it will be seen that this mechanism comprises a driving member acting by adhesion which, in the described example, consists of a driving roller 15 mounted on one of the two ends of a shaft 16 turning in a bearing 17. A driving pulley 18 (FIGURE 2) is mounted on the other end of the shaft 16 so as to be driven with a continuous rotational movement, for example by an electric motor, through a belt, and to transmit its rotational movement to the roller 15. The bearing 17 is provided with an arm 19 (FIGURE 1), which is in turn secured to a sleeve 20 adapted to rock about a fixed shaft 21. FIGURE 1 shows that the sleeve 20 is also provided with an arm 23, on the end of which there is mounted a rod 24 fast with the movable armature of an electromagnet 25. The electromagnet 25 is secured to the frame 26 of the driving mechanism through a right-angled member 27. The shafts 16 and 21 are parallel and are disposed substantially perpendicularly to the plate 10. The assembly comprising the sleeve 20, the arms 19 and 23, the bearing 17, the shaft 16, the driving pulley 18 and the roller 15 is adapted to pivot about the shaft 21, so that when the electromagnet is energised the arm 23 is attracted towards the electromagnet by the rod 24 and pivots the aforesaid assembly about the shaft 21. In this movement, the driving roller 15 is shifted towards the bearing plate 12 so as to occupy a position which will be referred to as the operative position. When the electromagnet 25 ceases to be energised, the assembly returns into the inoperative position under the action of a spring 29, which is fixed on the one hand to the bearing 17, and on the other hand to the frame of the driving mechanism.

FIGURE 1 also shows that a very thin intermediate plate 41 is disposed between the bearing plate 12 and the stack 11 of cards. This plate, which is referred to as a floating flap for reasons which will later become apparent, is secured at one end to the frame 26 of the driving mechanism by means of two cross-members, of which only one, bearing the reference 42, can be seen in FIGURE 1. In the described example, the other end of the floating flap is engaged in the throat 14 as illustrated in FIGURE 3, but it is to be noted that this arrangement is not essential and that the end of the floating flap need not be engaged in the throat, but it must nevertheless be sufficiently close to the latter to enable the flap to reduce to a minimum the contact between the cards of the stack and a card engaged between the bearing plate 12 and the said flap and thus to prevent such card from driving the cards of the stack by adhesion when the card is advanced towards the throat in a manner which will hereinafter be described.

FIGURE 3 further shows that the throat 14 is formed in conventional manner by means of an assembly comprising a lip 43 and a ledge 44 separated from one another by a distance substantially equal to the thickness of the floating flap plus the thickness of one card.

FIGURES 1 and 3 show that the floating flap 41 is disposed at a small distance from the bearing plate 12 so as to form between the flap and the bearing plate a so-called transit passage 45 in which there may be engaged cards advanced by continuously driven rollers A1 and A2. However, FIGURE 1 shows that the floating flap 41 is slightly curved at a point close to these two rollers, so as to form at the inlet of the transit passage 45 a sufficiently flared aperture to permit appropriate engagement of the cards in the passage.

The shape of the driving roller 15 is such as to ensure correct driving of the cards. For this purpose, the roller may be of a type similar to that illustrated in FIGURE 10, which shows a roller comprising two sets of two discs 28, each disc being formed with notches 46 in its periphery to give the said roller a knurled appearance which imparts thereto a relatively high coefficient of friction. The driving roller may also have the appearance of the roller which has been shown partly in section in FIGURE 11, and may comprise, as shown in this figure, two sets of two dished discs 47 which not only enable the cards to be appropriately driven, but also enable the said cards to be aligned in known manner against a reference surface at the instant when the roller comes into contact with the cards to be driven.

FIGURES 2 and 3 show that the bearing plate 12 is formed with two rectangular apertures 30 and 31 and that the floating flap 41 is likewise formed with two apertures 48 and 49 which correspond respectively, to the apertures in the bearing plate, in order to enable the driving roller, when brought into the operative position, to project through the said apertures and thus to come into contact with the cards to be driven. The guiding roller 15 is driven with a continuous rotational movement, while the energisation of the electromagnet 25 (FIGURE 1) takes place only intermittently, as will hereinafter be explained, in order to enable the continuously rotating roller 15 to be brought into contact with a card to be driven.

It will be appreciated from the described arrangement that the roller 15 may be brought into the operative position either to extract a card from the stack 11 towards the throat 14 or to drive a card engaged in the transit passage 45 and brought by means of the rollers A1 and A2 into a position level with the apertures 30 and 31 in the bearing plate. FIGURES 4 and 5 have the object of showing how the floating flap 41 is positioned in the case of the extraction of a card from the magazine. Under these conditions, the cards of the stack 11, which are pushed in the direction of the bearing plate 12 under the action exerted by the card-pressing plate 38 of the pressing device 13, maintain the floating flap 41 against the lip 43 of the throat. In this case, the floating flap is moved sufficiently far away from the ledge 44 of the throat to permit the first one of the cards of the stack 11, when the roller 15 comes into contact with that card through the apertures 30 and 31 in the bearing plate and the corresponding apertures 48 and 49 in the floating flap, to be driven and engaged between the rollers E1 and E2. On the other hand, when a card advanced by the rollers A1 and A2 is engaged in the transit passage 45 so as to be brought level with the apertures 30, 31, 48 and 49, the floating flap 41 is moved away from the bearing plate 12 by the card advancing through the transit passage, so that the floating flap 41 then comes into contact with the ledge 44 of the throat, as illustrated in FIGURE 6, and leaves between it and the lip 43 of the throat a gap through which the said card can leave the transit passage when it is driven by the roller 15 which has come into contact therewith through the apertures 30 and 31 in the bearing plate. FIGURES 6 and 7 show that the floating flap 41 makes it possible for a card engaged in the transit passage not to come into contact with the cards situated in the magazine, so that the roller 15 can discharge the said card from the passage and engage it between the rolllers E1 and E2 without this card driving the cards of the magazine towards the throat by adhesion.

As already pointed out in the foregoing, the floating flap need not have its end engaged in the throat. However, in this case, its end will have to be sufficiently close to the throat in order to minimise the contact between a card engaged in the transit passage and the cards situated in the magazine.

It will be seen from FIGURE 2 that the floating flap 41 has two slots 50 and 51 situated on either side of the throat 14 and extending in a direction parallel to the direction in which the cards are driven, in order to increase the flexibility of the said flap, and thus to facilitate the passage through the throat, of the cards extracted from the magazine or of the cards passing through the transit passage.

The engagement in the transit passage of a card driven by the rollers A1 and A2 is greatly facilitated by virtue of the fact that, in the described example, the bearing plate 12 has, as may be seen on referring to FIGURE 1, a plane portion extending substantially between the throat and the zone of contact of the roller 15 and a curved portion which extends away from the plane of the first portion while remaining on the side of the mechanism for the actuation of the roller. By reason of this arrangement, the cards of the stack 11 remain gripped between the card-pressing plates 38 and the plane portion of the bearing plate 12 only over a part of their length. Consequently, the cards successively advanced by the rollers A1 and A2 may be engaged in the transit passage and brought level with the apertures in the flap and in the bearing plate without having to overcome the resistance presented by the cards of the magazine which exert a pressure on the flap and on the bearing plate. However, it is to be noted that the shape of the base of the magazine does not constitute a feature of the invention and that, in the case of magazines having a flat base, known means may be employed to facilitate the engagement of the cards in the transit passage.

Likewise, the roller 15, which is employed to drive the cards in the described example, may be replaced by any other type of driving member such as a belt, a brush, a suction member, etc., excluding however the known oscillating-knife members, which, since they bear against the rear edge of the cards in order to push them towards the throat, would be unable to drive the cards engaged in the transit passage.

It is also to be noted that the driving member has only to act intermittently in order to effect a correct driving of the cards. Referring to FIGURE 4, for example, it will be seen that if the roller 15 were maintained in the operative position after having driven a card from the magazine, such as the card A, until it was engaged between the rollers E1 and E2, the succeeding card of the stack, bearing the reference B in FIGURE 4, would be in contact with the roller 15 immediately after the rear edge of the card A had passed under the roller. The card B would then in turn be driven by the roller before the card A had completely left the magazine and might thus cause a stoppage. In order to avoid this danger, the described arrangement is such that the roller 15 can be brought into the operative position for driving a card only when the trailing edge of the previously driven card has passed through the throat 14. In addition, the stoppage might also occur if the leading edge of a card engaged in the transit passage arrived under the roller 15 at the instant when a card from the magazine was already engaged in the throat, since under these conditions the floating flap 41, which is maintained in contact with the lip of the throat at the instant of the extraction of a card from the magazine, would close the passage necessary for the delivery of the card engaged in the transit passage. The card being extracted might then be jammed in the throat by the card engaged in the passage and driven in turn by the roller 15. In order to avoid this danger, the described arrangement comprises a card-detecting member disposed on that portion of the track which is situated in front of the rollers A1 and A2 and the function of which is therefore to produce a signal at the instant when a card travels past it before becoming engaged between the rollers A1 and A2 whose function is to engage it in the transit passage. The said signal is sent to circuits controlling the energisation of the electromagnet 25 (which circuits will hereinafter be described) in order to cause the roller 15 to be brought into the operative position at the instant when the card engaged in the passage comes level with the apertures 30 and 31 in the bearing plate. In the described example, the card-detecting member consists of a known photoelectric-cell device PH enclosed in a casing which is shown in FIGURE 1, and normally receiving an energising light beam emanating from a lamp enclosed in a casing L shown in FIGURES 1 and 2.

The operation of the assembly just described will now be explained in its practical application with reference to FIGURE 8, which illustrates by way of example the circuits controlling the energisation of the electromagnet 25, and to FIGURE 9, which graphically illustrates by way of example the positions occupied by various cards in the course of time. In this graphic illustration, the times during which the roller drives a card are indicated on a line situated below and in vertical alignment with the roller, by a thickened section, the times during which the said roller is in the inoperative position are indicated by a chain-lined section, and the times during which the roller passes from an inoperative position to an operative position, or vice versa, are indicated by an ordinary line.

The electric circuit diagram of FIGURE 8 is a basic diagram and comprises manually operated contacts and relay contacts designed to be employed under conditions which will be described. The relay contacts are denoted by the same reference as the winding by which they are controlled, preceded by the letter C. A contact which is normally closed, when the coil of the relay controlling it is not energised, is represented by a black triangle in FIGURE 8.

In the described example, it will be assumed that the extraction of the cards contained in the magazine is effected at a rate of eight-hundred cards per minute, so that it is necessary for the extracted cards to be taken up and thereafter driven at high speed by the rollers E1 and E2. In the example under consideration, the driving of the cards takes place at a linear speed of the order of 3.50 metres per second.

The extraction of the cards contained in the magazine is controlled by means of a switch KG, shown in FIGURE 8, which, when closed, causes a pulse generator GI to be fed from the positive pole of a current source. The pulse generator GI is designed to supply pulses when voltage is applied thereto, at a rate of one pulse every 75 milliseconds. These pulses are transmitted by a normally closed contact CB01 and a diode D1, and reach on the one hand a relay B02 and on the other hand, after having passed through a diode D3, a capacitor C35. The pulses applied to the relay B02 energise the said relay, which closes its contact CB02. Since the pulses supplied by the pulse generator GI may be of short duration, the capacitor C35, which is connected in parallel with the relay B02 through a resistor R2, enables the closing time of the contact CB02 to be extended by about 35 milliseconds. When the contact CB02 is closed, a direct current flows from the positive pole of the current source through the closed contact CB02 and energises the exciter coil of the electromagnet 25. Thus, as long as the contact CB01 is closed, the pulses sent by the pulse generator cause periodic closing, every 75 milliseconds, of the contact CB02, which remains closed in each instance for 35 milliseconds owing to the presence of the capacitor C35 and of the resistor R2. The diagram of FIGURE 9 shows that if the contact CB02 closes at an instant I1 in order to produce energisation of the coil of the electromagnet 25, the roller 15 leaves its inoperative position and enters the operative position, which it reaches at the instant C1. From this instant, the first of the cards contained in the magazine is in contact with the roller 15, which drives the card through the throat in order to engage it between the rollers E1 and E2. The roller 15 is maintained in contact with this card until the contact CB02 opens and thus de-energises the electromagnet 25, which happens at the instant F1, i.e. 35 milliseconds after the instant I1. The diagram shows that the leading edge AV of the card becomes engaged between the rollers E1 and E2 at the instant S1, i.e. before the roller 15 ceases to exert its driving action owing to the de-energisation of the electromagnet 25. The diagram also shows that the roller 15 ceases to exert its driving action at the instant F1, i.e. before the trailing edge AR of the card has travelled past the apertures 30 and 31 in the bearing plate. This arrangement prevents the roller 15 from being brought into contact with the succeeding card at the instant when the card driven by the rollers E1 and E2 ceases to be subject to the action of the roller but is still engaged in the chute. The roller leaves its operative position and returns into its inoperative position, which it reaches at the instant H1. At the instant I2 occurring 75 milliseconds after the instant I1, the contact CB02 again closes so as to enable the electromagnet 25 to be energised in order to return the roller into the operative position for the purpose of driving the succeeding card. If the photoelectric-cell device PH does not detect the passage of any card, the process which then starts at the instant I2 is similar to that produced by the transmission, by the generator GI, of the pulse which has produced the closing of the contact CB02 at the instant I1. This process has already been described and for this reason it will simply be indicated that in the course of this process the succeeding card is extracted from the supply magazine and driven by the rollers E1 and E2. Thus, as long as the cell PH does not detect the passage of a card, the cards in the magazine are extracted at a rate of one card every 75 milliseconds.

However, the extraction of the cards from the magazine is interrupted if a card is advanced along that portion of the track which is situated in front of the rollers A1 and A2 and then travels past the cell PH. FIGURE 8 shows that the cell PH is connected to an amplifying and differential member AMP which supplies a pulse each time the beam energising the cell and emanating from the lamp enclosed in the casing 11 is interrupted. FIGURE 9 shows that the said beam is interrupted at an instant IP when leading edge of the card which is to be engaged between the rollers A1 and A2 travels past the cell. From this instant, the amplifying and differential member AMP supplies a pulse which is transmitted, as shown in FIGURE 8, on the one hand through a delay element RT70 to a relay B04 and on the other hand to a relay B03. On being energised, the relay B03 closes its contact CB03 for a brief instant. Since the contact CB03 is closed, a direct current flows from the positive pole of the current source and on the one hand energises a relay B01 and on the other hand charges a capacitor C150 through a diode D4. The energised relay B01 opens its contact CB01 and thus prevents pulses supplied by the generator GI from being transmitted to the relay B02. The capacitor C150, which is connected in parallel with the relay B01 through a resistor R1, makes it possible for the contact CB01 to be kept open for at least 150 milliseconds. The pulse which has been sent by the amplifying and differential member AMP to the relay B04 is retarded by 70 milliseconds in passing through the delay element RT70. Thereafter, the relay B04 is energised in turn for a brief instanst and closes its contact CB04. During the time when the contact CB04 is closed, a direct current flows from the positive pole of the current source and, through the closed contact CB04 and a diode D2, on the one hand energises the relay B02 and on the other hand charges the capacitor C35 through the diode D3. The energisation of the relay B02 then triggers the closing of the contact CB02 as explained in the foregoing, whereby the coil of the electromagnet 25 is energised for a period of 35 milliseconds. Owing to the delay element RT70, the coil of the electromagnet is therefore energised by the closing of the contact CB02 which takes place 70 milliseconds after the cell has detected the passage of the leading edge of the card which is to be driven, successively and at the same speed, by the rollers A1 and A2, the roller 15 and the rollers E1 and E2. From the instant indicated by IT in the diagram of FIGURE 9 when the coil of the electromagnet 25 is energised, the roller takes up the operative position, which it reaches at the instant CT. Taking into account the speed at which the card is driven, the diagram of FIGURE 9 show that, at the instant CT when the roller 15 reaches the operative position, this card is still engaged between the rollers A1 and A2, while its leading edge is already situated level with the apertures 30 and 31 in the bearing plate, so that the roller 15 is in contact with the said card at the instant CT and drives it in turn towards the throat and the rollers E1 and E2. The roller 15 ceases to drive this card at the instant FT, which arrives 35 milliseconds after the instant IT, owing to the opening of the contact CB02. The diagram of FIGURE 9 shows that, at the instant FT when the roller leaves its operative position, the card is already engaged by its leading edge between the rollers E1 and E2, which in turn drive it. At the instant HT, the roller 15 has returned into the inoperative position.

The instant IP at which the leading edge of a card travels past the cell PH may a priori occur at any time. More particularly, it may happen that this instant occurs very shortly before the closing of the contact CB02. In this case, the pulse supplied by the amplifying and differential member AMP and transmitted to the relay B03 may cause the contact CB01 to open, by virtue of the energisation of the relay B01, but cannot prevent the contact CB02 from closing for 35 milliseconds owing to the energisation of the relay B02, which is caused by the transmission of a pulse by the generator GI just before the opening of the contact CB01. This case is illustrated in the diagram of FIGURE 9, in which the contact CB02 closes, at the instant I2, several milliseconds after the instant IP when the cell PH has detected the passage of the leading edge of a card. The diagram shows that, under these conditions, the extraction of a card by the roller, brought into the operative position between the instant C2 and F2, remains possible because, at the instant when the leading edge of the card driven by the rollers A1 and A2 arrives under the roller, the trailing edge of the card which has just been extracted from the magazine has already passed through the throat. The diagram shows that the roller even has time to return to the inoperative position and to remain in this position between the instant H2 and IT before being again urged to take up the card which has been advanced by the rollers A1 and A2.

As has been explained in the foregoing, the contact CB01 is kept open for 150 milliseconds from the instant IP owing to the presence of the capacitor C150. This arrangement has the object of preventing pulses, which are sent by the generator GI, from being transmitted to the relay B02 while the card which has been advanced by the rollers A1 and A2 is still in the transit passage. At the instant VG, which occurs 150 milliseconds after the instant IP, the relay B01, which is de-energised owing to the fact that the capacitor C160 has ceased to discharge, closes its contact CB01. The diagram shows that at the instant VG the trailing edge of the card which has just passed through the transit passage has left the throat, so that the roller may be returned to the operative position in order to extract a card from the magazine. This extraction may be triggered by the transmission of a pulse by the relay GI at an instant I3 following the instant VG in order to enable the roller to take up the operative position at an instant C3 and to drive another card from the magazine towards the throat and the rollers E1 and E2.

However, it may happen that a number of successive cards travel past the cell PH before being successively driven, one after the other, by the rollers A1 and A2, the roller 15 and the rollers E1 and E2. If it is considered that these successive cards are driven at a uniform speed and in such manner that the leading edge of each of them travels past the cell PH at instants separated by intervals of time of 75 milliseconds, the amplifying and differential member AMP therefore supplies a pulse each time the leading edge of a card travels past the cell, so that a series of pulses equal to the number of the said cards energises the relay B03 which closes its contact CB03 each time. Thus, as long as pulses are transmitted to the relay B03, the relay B01 remains energised and keeps its contact CB01 open, since the intervals of time between the instants at which these pulses are transmitted are of a length of 75 milliseconds. The driving of each of these cards successively entering the transmit passage is thereafter effected by the roller 15, which comes into the operative position each time as a result of the energisations of the relay B04 which closes its contact CB04 in each instance in order to permit energisation of the coil of the electro magnet 25. The extraction of the cards from the magazine may be resumed as soon as the contact CB01 closes, i.e. 150 milliseconds after the leading edge of the last of the cards advancing one after the other and driven by the rollers A1 and A2, the roller 15 and the rollers E1 and E2 travel past the cell PH.

Of course, various modifications which do not depart from the scope of the said invention may be made to the embodiment just described by way of example. Thus, for example, the electric circuit arrangement comprising relays as illustrated in the drawings may be entirely or partially replaced by any equivalent electric circuit utilising electron tubes, transistors or like elements.

We claim:

1. In a record-card machine, a card-driving arrangement for driving cards one-by-one to a first set of driving rollers, either from an associated card magazine or from a second set of rollers disposed upstream in relation to the driving direction, the said magazine containing a stack of cards to be extracted through a throat and comprising a fixed bearing plate disposed transversely to the thickness of the stack in order to retain the said cards and situated substantially in the plane of the throat, a movable pressing member arranged to urge the stack of cards against the bearing plate, and a driving member arranged to act intermittently on the cards through apertures in the bearing plate, so as successively to drive each card through the throat towards the first set of rollers, the said arrangement being characterised in that it comprises in addition a thin flexible plate, called a floating flap, of which one of the ends is situated close to the throat and of which the other end is fast with a fixed point of attachment, the said flap being arranged between the bearing plate and the stack of cards of the magazine so as to constitute, between the bearing plate and the said flap, a transit passage in which a card may be advanced by the second set of rollers, the said flap also being formed with apertures situated opposite the apertures in the bearing plate in order to permit the passage of the driving member, in such manner that the latter can drive towards the throat either a card from the stack of cards in the magazine or a card fed by the second set of rollers.

2. A card-driving arrangement according to claim 1, wherein the throat consists of a ledge (44) and a lip (43) spaced apart by a distance corresponding substantially to the thickness of a card plus the thickness of the floating flap, so that when no card is engaged in the transit passage the floating flap is applied against the lip of the throat under the action of the pressure of the cards subjected to the action of the movable pressing member, and leaves a sufficient space for the passage of a card extracted from the magazine, while when a card is engaged in the transit passage and advanced to a position level with the apertures in the bearing surface, the floating flip, urged by the said card, is applied against the ledge of the throat and leaves a sufficient space for the passage of the said card when the latter, driven by the driving member, passes between the lip and the floating flap.

3. A card-driving arrangement according to claim 2, wherein the said driving member acting by adhesion consists of a roller continuously rotating about a shaft parallel to the throat, the said shaft being mounted in a bearing fixed to one of the two ends of a lever adapted to pivot about a fixed shaft, while the other end of the said lever is coupled to the movable armature of an electromagnet in such manner that the energisation of the electromagnet produces the pivoting of the said lever in one direction to permit engagement of the roller with a card to be driven, while when the electromagnet ceases to be energised the movement of the lever in the opposite direction by a spring produces the disengagement of the roller from the driven card.

4. A card-driving arrangement according to claim 3, characterised in that there are provided control circuits (D1, B02, CB02, 25) to control the energisation of the electromagnet, and a pulse generator (GI) connected to the said circuits to apply periodic pulses thereto, the control circuits being arranged to effect the energisation of the electromagnet in response to each of the pulses received in order to enable the roller to extract the cards periodically one-by-one from the magazine until they are taken up by the first set of rollers.

5. A card-driving arrangement according to claim 4, wherein a card-detecting member is arranged to detect the passage of the leading edge of a card before it becomes engaged in the transit passage, the said member being connected to the control circuits through a delay element and a switching circuit arrangement to apply to the control circuits a signal generated by the detecting member, the delay element being designed to delay the said signal in such manner that the electromagnet is energised so as to permit the engagement of the roller with the card advanced along the transit passage at the precise instant when this card is brought level with the apertures in the bearing plate.

6. A card-driving arrangement according to claim 5, characterised in that there is provided a switch (CB01) which is normally closed and which forms part of a relay (B01) subjected to the control of the card-detecting member, the energisation of the said relay being maintained by a monostable holding circuit (R1, D4, C150), the said switch being disposed between the pulse generator and the circuits controlling the energisation of the electromagnet in order to prevent the transmission of the pulses emanating from the generator between the instant when the detecting member detects the passage of the leading edge of a card before it becomes engaged in the transit passage, and the instant when the trailing edge of the said card has passed through the throat.

References Cited
UNITED STATES PATENTS 3,262,698    7/1966    Wijngaart.

EDWARD A. SROKA, *Primary Examiner.*